United States Patent
Tüllmann et al.

(10) Patent No.: US 8,845,246 B2
(45) Date of Patent: Sep. 30, 2014

(54) MACHINE TOOL

(75) Inventors: Udo Tüllmann, Eisenach (DE); Matthias Brand, Seebach (DE)

(73) Assignee: Deckel Maho Seebach GmbH, Seebach (DE)

( * ) Notice: Subject to any disclaimer, the term of this patent is extended or adjusted under 35 U.S.C. 154(b) by 878 days.

(21) Appl. No.: 13/009,479

(22) Filed: Jan. 19, 2011

(65) Prior Publication Data
US 2012/0020753 A1 Jan. 26, 2012

(30) Foreign Application Priority Data

Jan. 19, 2010 (DE) .......................... 10 2010 004 990

(51) Int. Cl.
*B23Q 1/01* (2006.01)
(52) U.S. Cl.
CPC ............... *B23Q 1/012* (2013.01); *B23Q 1/015* (2013.01)
USPC ........... 409/190; 409/235; 409/189; 409/202; 409/212
(58) Field of Classification Search
CPC .......... B23C 1/002; B23Q 1/017; B23Q 1/01; B23Q 1/70; B23Q 11/0067; B23Q 2701/01; B23Q 2705/104; B23Q 1/012
USPC ............ 408/89, 234; 409/137, 185, 189, 190, 409/191, 197, 198, 201, 202, 211, 212, 216, 409/221, 235
See application file for complete search history.

(56) References Cited

U.S. PATENT DOCUMENTS

| | | | |
|---|---|---|---|
| 4,658,485 A * | 4/1987 | Yang | 29/26 A |
| 5,669,867 A | 9/1997 | Hoppe | |
| 5,839,323 A | 11/1998 | Line | |
| 5,909,988 A | 6/1999 | Hoppe et al. | |
| 6,948,894 B2 | 9/2005 | Taga et al. | |
| 7,192,225 B2 * | 3/2007 | Takayama et al. | 409/134 |
| 7,356,895 B2 * | 4/2008 | Ota | 29/27 C |
| 7,493,681 B2 * | 2/2009 | Schmidt et al. | 29/26 A |
| 7,591,620 B2 | 9/2009 | Schmidt et al. | |
| 2007/0170140 A1 * | 7/2007 | Gaunekar et al. | 212/312 |
| 2010/0207496 A1 * | 8/2010 | Tatsuda | 310/67 R |

FOREIGN PATENT DOCUMENTS

DE 10139296 A1 3/2003
WO WO 2009144845 A1 * 12/2009

OTHER PUBLICATIONS

English translation of WO 2009144845 A1.*
English translation of WO 2009144845 A1, Dec. 2009 (document previously provided).*

* cited by examiner

*Primary Examiner* — Andrea Wellington
*Assistant Examiner* — Alan Snyder
(74) *Attorney, Agent, or Firm* — The Makham Firm

(57) ABSTRACT

A machine tool comprising a machine frame having dimensionally rigid side walls, each including top-side horizontal guide rails. A compound slide is displaceable in or on the guide rails. On the front of the compound slide is a machining unit comprising a spindle head which is vertically displaceable. A workpiece mounting unit is disposed in the space between the side walls. The workpiece mounting unit may have a workpiece table or a workpiece chucking device. In order to form an enlarged access to the work area of the machine tool, one side wall is shorter at the front than the other side wall. Further, the linear guides or guide rails mounted to the side walls of the machine frame may be aligned at an acute angle α to the vertical center plane of the machine frame.

22 Claims, 5 Drawing Sheets

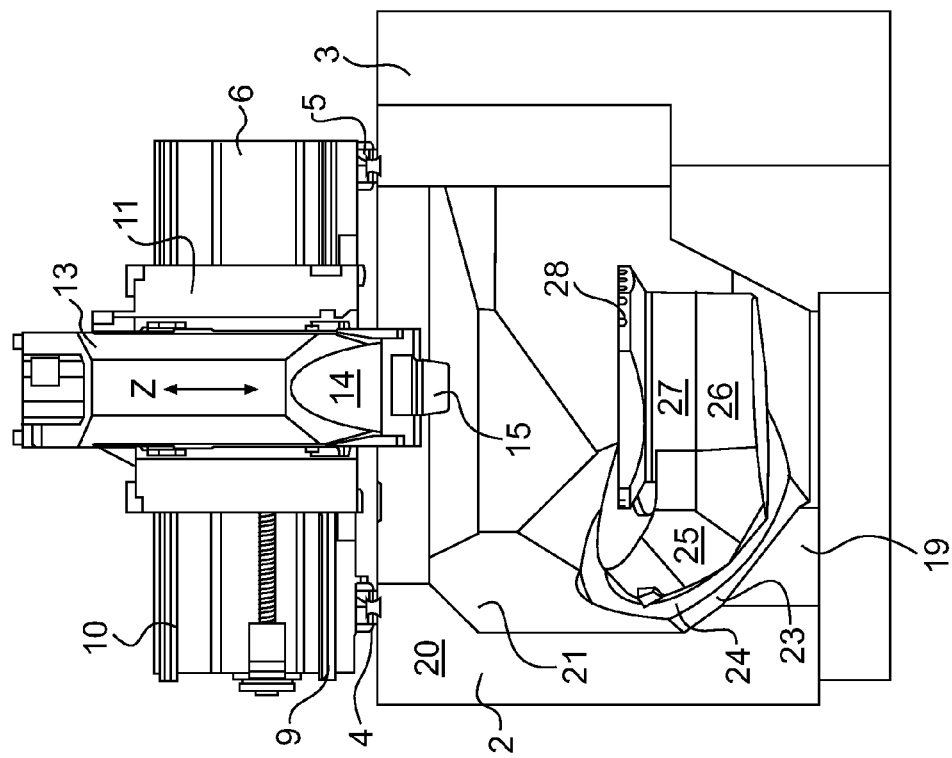
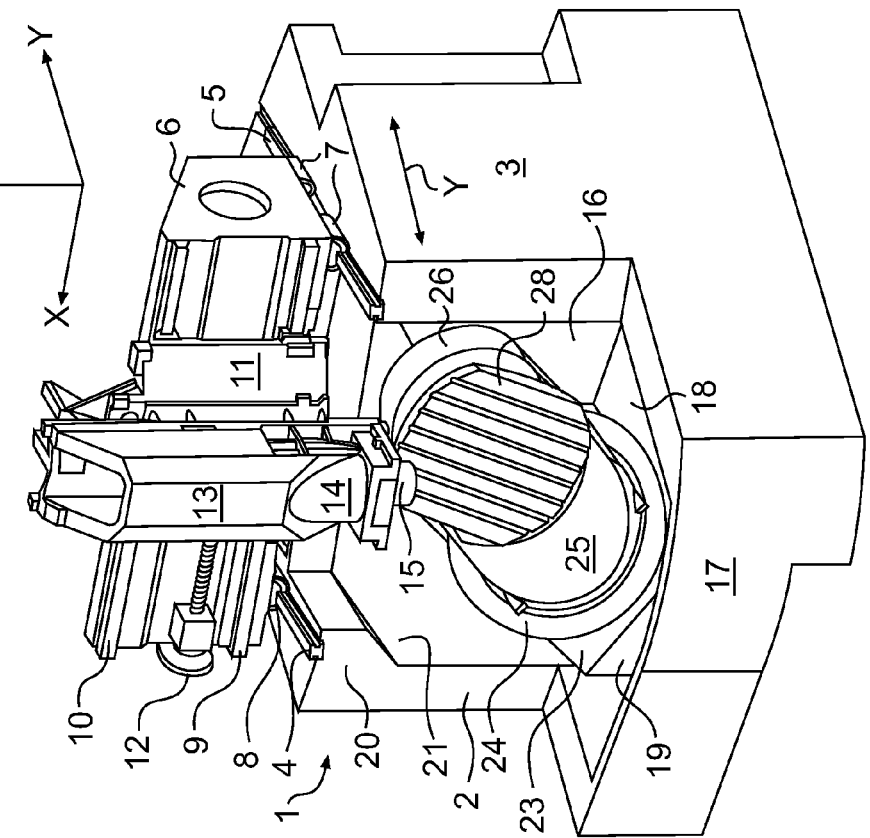

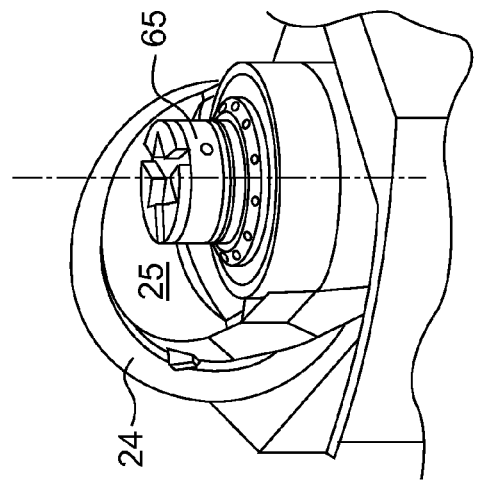
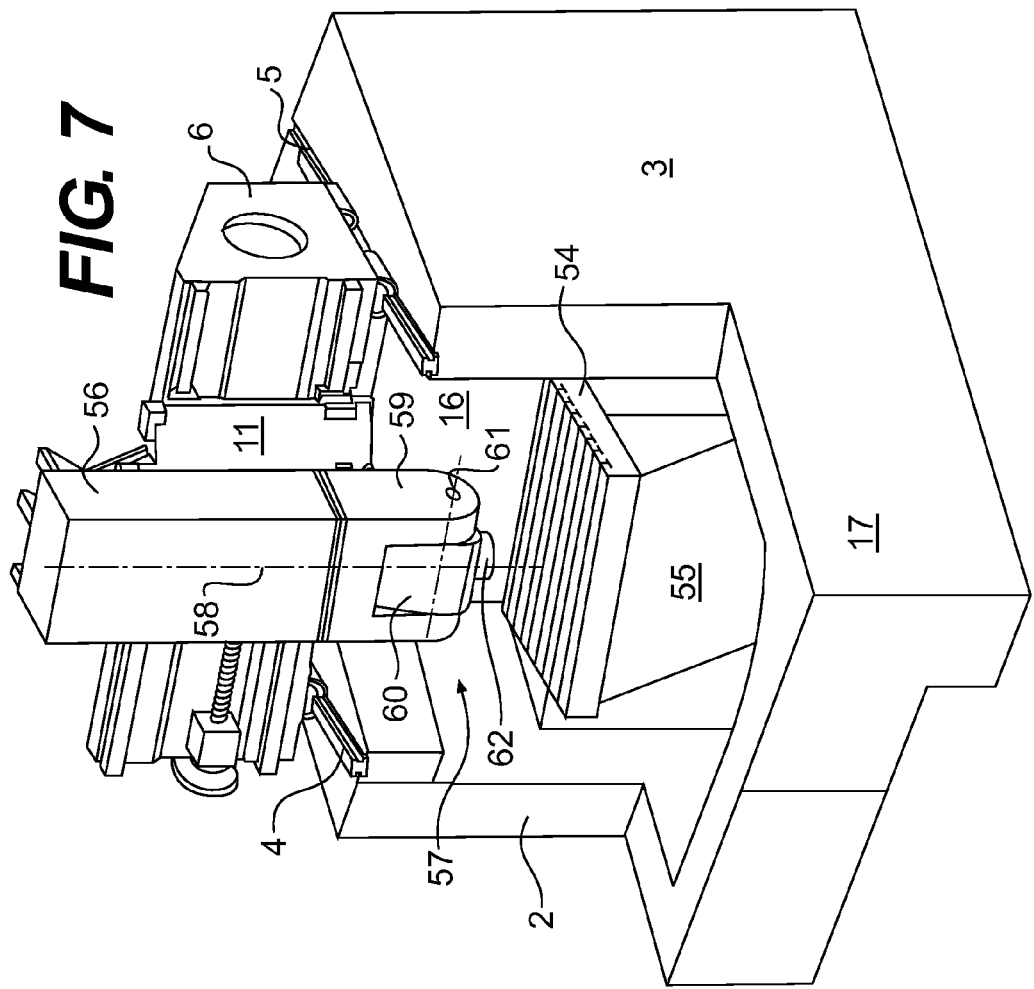

MACHINE TOOL

FIELD OF THE INVENTION

The invention relates to a machine tool comprising a machine frame having dimensionally rigid side walls including top-side horizontal linear guides, a compound slide that can be moved on or in the linear guides of the side walls, on whose front a machining unit comprising a spindle head is guided so as to be vertically displaceable, and a workpiece mounting unit disposed in the space between the side walls, which workpiece mounting unit may have a workpiece table or a workpiece chucking device.

BACKGROUND

Machine tools of this type comprising two dimensionally rigid parallel side walls, a cross slide displaceable on guides on the top surface of the side walls and a front machining unit that can be equipped with chipping tools are referred to as so-called gantry machines. Usually, in this machine type the cross slide moving in the Y coordinate axis on parallel guide rails on the two side walls forms a crosshead and supports a longitudinal slide displaceable in the X coordinate axis. A vertical slide that can be displaced in the Z coordinate axis may be guided on this longitudinal slide as a carrier of a machining unit. Mostly, a workpiece table is used as workpiece mounting unit for one or more workpieces to be machined, which is mounted in the space between the two side walls on the machine bed.

In order to achieve multi-axis and multi-side machining options of a workpiece in one clamping, the workpiece table may be realized as a rotationally driven rotary table in more complex machines of this type. A dimensionally stable bed-like bottom connects the two side walls so that they form a dimensionally rigid overall construction having a favorable temperature or heat behavior. In conventional machines of this type the workpiece mounting unit is mounted to the bed-like bottom mostly in the shape of a rotary or swiveling table construction. One of the particular advantages of the gantry constructional style is the high rigidity of the machine frame which enables maximal machining precision as well as high static and dynamic loads and correspondingly high chipping performances. Furthermore, the symmetric structure of the machine frame has a favorable effect on the temperature behavior of the overall machine. However, a disadvantage of this machine type is a limited accessibility to the workpiece table for placing and removing workpieces. Access to the work area in conventional gantry-type machines is limited by the front parts of the two side walls so that loading and unloading always has to be done directly from the front.

Furthermore, machine tools are known, for example, from German patent, DE 10 2006 034 123 B4, whose machine frame has two side walls and a bottom-like bed solidly fixed to one another. A slide construction and a machining unit thereon are disposed on the side walls so as to be displaceable in three coordinate axes via linear guides. In order to achieve a five-axis machining option of a workpiece a swiveling bridge table is provided between the two side walls. The swiveling bridge is supported in two end-side stable support bearings in the side walls of the machine frame so that it can be swiveled about a horizontal transverse axis. For performing the swiveling movements, two electrically synchronized direct drives, preferably torque motors, are used. A rotary table that can rotate about a vertical central axis and serves to solidly accommodate a workpiece is disposed in the bridge part between the two support bearings. In this machine, the swiveling bridge of the swiveling bridge table is not directly supported in the two side walls of the machine frame but in two slides, these slides being synchronously displaceable on linear guides on the inner surfaces of the two side walls of the machine frame. As drive units two electrically synchronized linear motors are used whose electrically active components are disposed between the slides and the side walls. Due to the possibility to displace the swiveling bridge in the direction of the Y coordinate axis, accessibility to the workpiece table is improved which, however, is achieved only by accepting more technical effort due to, among others, the linear adjusting drives of the swiveling bridge construction. In addition thereto, the integration of powerful electric direct drives into the central bridge part of the swiveling bridge for obtaining a powerful direct drive of the rotary table causes problems because there is only a limited space for the electric motor. By accommodating the swiveling axis in the two support bearings in the side walls of the frame, it is possible to achieve sufficiently high rigidity even in case of large diameters of the tool tables. However, the high amount of material input and the relatively large space required for the swiveling bridge are a disadvantage. When the workpiece support is turned to the 90° position, a limitation of the work area may result and, as the case may be, reduce the rigidity of the overall construction.

In addition to the machine tools in gantry constructional style, complex machine tools and machining centers, respectively, for machining workpieces in multiple axes, particularly five axes, are known that have three linear axes disposed in a Cartesian manner as well as two rotational axes. The machining unit can be displaced by a motor on the top side on a machine frame in a horizontal plane in the X and Y axes via a compound slide and is mounted to the front of the table construction so as to be displaceable in the Z axis via a vertical slide. A machine tool of this type, known from German patent publication DE-A 196 41 831, has a circular recess in the vertical front wall thereof in which the circular foot of a support console is supported so that it can be rotated by a motor about a horizontal axis by using a suitable bearing structure. The circular disk-shaped console foot is a part of a projecting support console that has a support surface running parallel to the rotational axis in its free end area for supporting a rotary table. The rotary table provided with chucking grooves for fixing a workpiece may be directly driven by a suitable drive unit or via gearing means. Due to contradicting requirements for a dynamic interpolating machining the point of intersection of the two rotational axes is relatively far above the table surface. This means that when the workpiece table is turned to the vertical 90° position, a relatively large part of the work area is lost and relatively large linear movements of the machining unit have to be carried out in the XYZ coordinate system during five-axis machining. In addition thereto, a change of the bending of the projecting console part due to its own weight and the weight of the workpiece during the rotation about the horizontal swiveling axis may have a negative effect. As the direction of the force attack changes, different deformation conditions result.

Apart from that, a machine tool for machining workpieces in five axes is known from German patent publication DE 44 44 614 A, in which a recess having a support surface inclined by 45° is formed in the front of a continuous machine stand. On this support surface, inclined at an angle of 45° to the vertical, rests a circular or circular ring-shaped foot of a console which has a forward pointing support projection including a rotational axis aligned by 45° to the rotational axis of the console foot. A rotary table rotatable about a vertical axis is supported on this support surface, which contains chucking means for fixing a workpiece on the top surface thereof.

German patent publication DE 10 2004 049 525 A describes a similarly designed machine tool in which the console foot is not centrally disposed in a recess or on the face of the pedestal of the machine stand but is laterally offset relative to the center of the machine stand. The console is located in a corner area at the front of the machine stand and supported there in a pivoted manner on the surface inclined by 45° of a pedestal. This arrangement allows an over-tilted position of the rotary table and thus negative orientation angles relative to the vertical Z axis. This embodiment exhibits the special fact that when the workpiece table swivels therethrough, a corresponding recess must be provided in the machine bed, which impairs the arrangement and selection of powerful direct drives. For example, the direct drives required for turning large workpieces demand corresponding dimensions, in particular, sufficient overall heights.

SUMMARY OF EMBODIMENTS OF THE INVENTION

It is a purpose of embodiments of the invention to provide a program-controlled machine tool having high rigidity in a gantry constructional style, which enables five-axis milling and turning machining even of large and bulky workpieces. Another purpose is to provide an enlarged and thus improved access to the work area.

According to embodiments of the invention, these purposes are achieved in some embodiments by the fact that the linear guides on the side walls of the machine frame are aligned at an acute angle to the vertical center plane of the machine frame and that one side wall of the machine frame is shorter at the front than the other side wall for forming an enlarged access to the machining space.

By diagonally positioning the two linear guides at an acute angle to the vertical center longitudinal plane of the machine frame, the cross slide displaceable on the linear guides moves in a direction obliquely running at an acute angle to the vertical center plane of the machine frame and the Y coordinate axis, respectively. As additionally to the inclined alignment of the linear guides and the guide rails, respectively, one side wall is shorter by a certain amount than the other side wall of the machine frame, resulting in an access opening enlarged by a lateral portion to the work area of the machine, that is, to the chucking means of the workpiece mounting unit. This chucking means usually consists of the chucking plate of a rotary table. However, it may also be a chuck for clamping rotationally symmetrical workpieces. The inventive inclined positioning of the linear guides thus eliminates the disadvantage of relatively limited accessibility of the workpieces to be machined of conventional machine tools of the gantry type while maintaining the advantages of this machine type, in particular the high rigidity and machining precision.

A generic machine tool is characterized according to another aspect of the invention by the fact that the two linear guides run parallel to the vertical center plane V of the machine frame and thus to the Y coordinate axis. The face edge of the cross slide runs diagonally at an acute angle to the transverse vertical plane of the machine frame and thus to the X coordinate axis. One side wall of the machine frame is shorter than the other side wall, whereby an enlarged access to the workpiece table and the work area of the machine, respectively, is formed. Even in a gantry-type machine thus designed, the aimed-for advantages of an enlarged area of access to the work area result while the construction is structurally simple and rigidity is high. The larger access from the front and at an angle from the front makes it possible to use mechanical loading devices, such as mobile or stationary loading robots, manipulators, cranes, or the like, for positioning relatively large and heavy workpieces on the workpiece table.

According to a suitable embodiment of the invention the machine frame has two vertical side walls with the top-side linear guides, a bed-like base as well as a dimensionally stable rear wall solidly connected to the side walls and the base. The workpiece mounting unit is suitably disposed in or on the bed-like base between the side walls of the machine frame, preferably on a pedestal that is solidly connected to one of the side walls or to the dimensionally stable rear wall, or both. Based on this design, an extremely high rigidity is imparted to the machine frame because the individual frame members may be implemented as a cast part or formed by a welded construction so as to be integrated as an inherently rigid uniform molded body.

In order to use the inventive machine tool for heavy roughmachining with high chip formation it is suitable to provide a floor tray as part of the bed-like base which serves as a chip collecting device. In this floor tray conventional transport and cleaning means for the treatment and removal of chips and liquids may be provided.

In another suitable embodiment of the invention, the cross slide displaceably supported on the linear guides of the side walls has a trapezoidal form, as seen in a plan view. The shorter support side of the cross slide belongs to the shorter linear guide and the longer support side of the cross slide belongs to the longer linear guide. The enlargement of the linear guide on a side wall of the machine frame leads to an increased transverse rigidity of the two linear guides in total and thus to an increased accuracy, even in case of displacing movements under high operating loads. In this case, the front of the trapezoidal cross slide in one embodiment should run at right angles to the two linear guides on the side walls and thus be diagonally aligned relative to the vertical center plane of the machine frame at the same acute angles. This has a favorable effect on control efforts.

A purpose of the invention is also to provide a program-controlled machine tool for machining workpieces, comprising a dimensionally stable frame including two side walls, a horizontally movable compound slide comprising a cross slide linearly displaceable on the side walls, and a vertical slide supporting a machining unit. It also has a workpiece mounting unit disposed between the two side walls for holding and fixing at least one workpiece. A feature of this machine tool is that the workpiece mounting unit is realized as a swiveling/rotary table and has a swiveling console forming an angled support for a workpiece rotary table.

Such machine tool implements the combination of the gantry constructional style with a swiveling/rotary table, which enables the five-axis machining of workpieces while maintaining the advantages of high rigidity and machining accuracy achieved by the gantry constructional style. The advantages of an improved accessibility to the work area achieved in comparison to conventional machines of the gantry type are achieved according to embodiments of the invention by the inclined positioning of the linear guides of the cross slide or the oblique alignment of the face edge of the cross slide displaceable in the direction of the Y coordinate axis, and by shortening one of the side walls of the machine frame.

Particularly stable and favorable positioning options for the mounting of workpieces result in a suitable embodiment if a pedestal is provided on a bed-like base of the machine frame as support for the console of the workpiece mounting unit. The pedestal should have an oblique surface inclined at an acute angle as a support surface for the console foot of the console.

A particularly high rigidity of the overall construction may be achieved by the fact that the pedestal is solidly connected to the base and the bottom, respectively, and to at least one of the frame walls, that is, one of the side walls or the rear wall, or both. Particular advantages as to strength and dimensional stability result if the pedestal is disposed in a corner area of the machine frame and is integrally formed with or solidly connected to the adjoining components, wherein the support surface thereof for the console foot should point obliquely into the forward interior space.

Furthermore, it is of advantage if the console of the swiveling/rotary table is supported and held in or on a side wall or the rear wall of the machine frame by using its console foot so that it can be swiveled about a horizontal axis. Here, a recess open toward the interior space may be provided in one side wall or rear wall of the machine frame.

The combination of the swiveling/rotary table with a machine frame of the gantry constructional style results in the good accessibility typical of the machines comprising a swiveling/rotary table and good dynamics due to the table kinematics. Additionally, the combination also yields the high rigidity and accuracy, the higher table loads, and particularly also the possibility to smoothly perform milling and turning operations on a workpiece, which are typical of machines of the gantry type. The improvement of the machine rigidity is achieved in that only the Z slide having varying projections can be moved in the work area of the machine. For the same reason the accuracy of dynamic milling is improved because due to the higher rigidities of the slide a better track accuracy with higher feeds and higher axis reinforcement becomes possible. The fact that large proportions of the thermal growth are always caused by deformations of the slides having varying projections as a consequence of one-sided heating by drives and guides, which is not the case in the present machine or only to a limited measure, also contributes to the improvement of machining accuracy and dimensional stability of the machine. The combinatory concept also offers the possibility to provide direct drives for the rotary table in the shape of powerful torque motors below the machining table as the design of the machine bed. The changed guide arrangement makes it possible to swivel the table without leading to undesired bending.

Another purpose of the invention embodiments is also a machine tool in gantry constructional style in which the machine frame has two side walls and two linear guides thereon extending in the direction of the Y coordinate axis. On these linear guides, a cross slide is disposed so as to be displaceable by a motor in the Y direction, on which are guided cross slide longitudinal slides including a machining unit vertically displaceable thereon. The face edge of the cross slide runs at an acute angle diagonally to the X coordinate axis and to the transverse vertical plane of the machine frame, respectively. Furthermore, one side wall of the machine frame is shorter than the other face wall whereby an enlarged access to the workpiece table and the work area, respectively, of the machine is formed. In order to obtain improved guiding, the cross slide, in a plan view, has a trapezoidal form. Even in a machine tool thus realized the different workpiece mounting units, such as, for example, the above-mentioned swiveling/rotary workpiece tables, may be used. In particular, by combining the various workpiece mounting units or workpiece swiveling/rotary tables with the gantry constructional style this may also be achieved in machines according to the gantry concept modified in the above manner according to the invention.

BRIEF DESCRIPTION OF THE DRAWING

Further purposes, advantages, and particulars of the invention can be taken from the following detailed description with reference to the accompanying drawing, wherein:

FIG. 1a schematically shows a first embodiment of the machine tool in accordance with the invention in a perspective representation;

FIG. 1b is front view of the apparatus of FIG. 1a;

FIG. 1c is a plan view of the apparatus of FIG. 1a;

FIG. 7 is yet another embodiment of the inventive machine tool in a schematic, perspective representation, comprising a rigid console workpiece table and a machining unit movable in three linear axes and two rotational axes; and FIG. 8 is a perspective view of a tool mounting unit for use with the machine tool embodiments identified in FIGS. 1-7, realized in this case as a rotationally driven chuck integrated in a swiveling console.

DETAILED DESCRIPTION OF EMBODIMENTS OF THE INVENTION

Figure 1C:
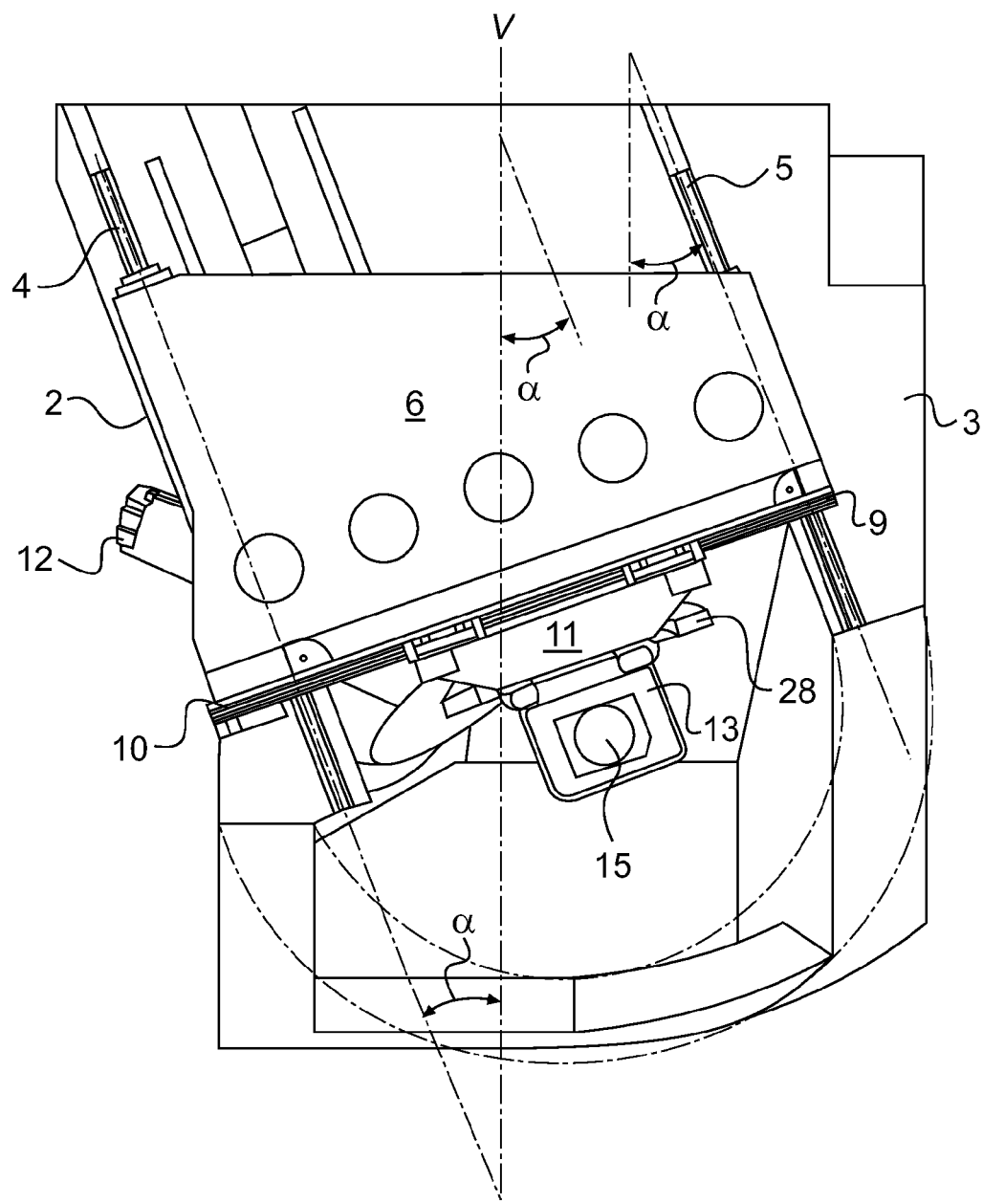

The machine tool shown in FIG. 1 in various views is implemented in a gantry constructional style and normally includes program control units, tool changers, and other additional units (not shown). Machine frame 1 is preferably realized in an integral constructional style in order to achieve the desired high rigidity. Two side walls 2, 3 extend parallel to the Y coordinate axis and carry horizontal guide rails 4, 5 on the top side thereof as part of linear guides for cross slide 6 that is displaceably guided on the horizontal guide rails via respective guiding shoes 8, 7. Electric motors comprising spindle drives or electric linear motors (not shown) are used as drives for the displacing movements of cross slide 6 forming a crosshead spanning side walls 2, 3. On the face of the cross slide, slide 11 is guided in two vertically spaced-apart guide rails 9, 10 by means of motorized drive unit 12 so as to be displaceable horizontally and transversely to guide rails 4, 5. Vertical slide 13 can be displaced by a motor (not shown) in vertical linear guides on the front of slide 11, which vertical slide carries machining unit 14, including work spindle 15.

According to a feature of the invention, side wall 3 of machine frame 1 facing the viewer in FIG. 1a is shorter than opposite side wall 2. Furthermore, guide rails 4, 5 on the tops of side walls 2, 3 are aligned at an acute angle α of about 15 to 45° to the vertical longitudinal plane V of machine frame 1 and the Y coordinate axis, respectively, as shown in FIG. 1c.

The base of the machine frame is formed by machine bed 18 extending in the shape of a flat tray between rear wall 16 and side walls 2, 3 up to the front end of the side walls and being surrounded by heightened rim 17. This tray-type bed 18 not only serves as a dimensionally rigid support and to solidly, optionally integrally connect side walls 2 and 3 but may also form a storage basin for chips and operating liquids. Bed 18 is defined by continuous heightened rim 17 on both sides and at the front. The side walls and the front rim are supported on the floor via feet (not shown). In the embodiment as shown, pedestal 19 is disposed on bed 18, which pedestal is solidly connected to longer side wall 2, to rear wall 16 and also to the bottom of bed 18. Recess 21 facing inward is formed below upper thickened end portion 20 of the longer side wall 2.

Pedestal 19 has inclined surface 23 pointing toward the front top into the interior space of machine frame 1 at an angle of 35 to 60°. Surface 23 is a support surface for supporting annular disk-shaped console foot 24, which is part of console 25, so that it can be rotated by a motor. On the top of projecting support arm 26 of console 25, rotary table 27 is mounted. Workpiece chucking plate 28 is mounted to the rotary table. In the interior space of support arm 26 and at least in part also in rotary table 27, an electric drive motor, for example, a powerful torque motor, may be installed. Such motor (not shown) puts rotary table 27, including the chucking plate 28 and a workpiece mounted thereon, into rotation and can also effectively lock it. For such a console concept the possibility of realizing the electric drive motor as a powerful torque motor, which can be conceded a sufficient overall height, is a particular advantage. Thus, by using the console concept as shown, milling as well as turning operations can be performed on a workpiece in the same clamping with sufficiently high chipping performances.

In contrast to conventional comparable machines, the above described embodiment of the inventive machine tool in a gantry constructional style has a considerably enlarged accessibility area, which is outlined in FIG. 1c by the arc shown in dashes and dots. As shown, this access area extends between the two facing edges at the front of side walls 2, 3. According to an embodiment of the invention, the enlargement is achieved by shortening one side wall in relation to the other side wall and, in combination therewith, by diagonally positioning guide rails 4, 5 relative to the vertical V without affecting the other advantages of the gantry constructional style, such as high stability and machining accuracy of the machine tool. While side wall 3 is shortened in the drawing, either side wall could be the one shortened.

Furthermore, there is the advantage of this embodiment, which can be taken from FIG. 1c, that crosshead-like cross slide 6, in a plan view, has the shape of a trapezoid and that the longer support side, the left one in FIG. 1c, of trapezoidal cross-slide 6, has a considerably larger guiding length than a conventional slide which is rectangular in a plan view. Thus, a considerably improved guiding stability and bending rigidity of the cross slide and thus also of the other slides mechanically and functionally coupled to the same is achieved.

Figure 2A:
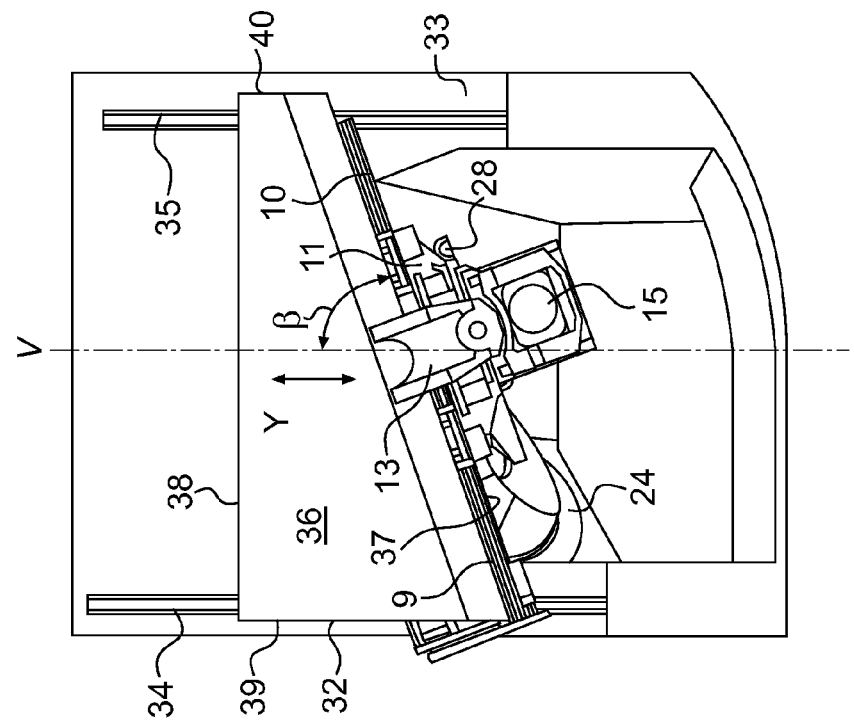
FIG. 2a schematically shows another embodiment of the inventive machine tool in a perspective representation.

Regarding its technical concept, the machine tool shown in FIGS. 2a, b in a gantry constructional style corresponds to the embodiment of FIG. 1. Accordingly, the same or functionally alike components in the embodiment of FIG. 2 are denoted by the same reference numerals as in the embodiment of FIG. 1.

According to FIG. 2a, machine frame 1 comprises two side walls 32, 33 in parallel which are connected to each other at the front via a wall shoulder on the face by heightened rim 17 of the front part which is lower as compared to the top of side walls 32, 33. Guide rails 34, 35 are mounted to the respective top surfaces of side walls 32, 33, each running parallel in this embodiment to the longitudinal direction of the side walls in the direction of the vertical center plane V and thus the Y coordinate axis. Cross slide 36 is guided so as to be displaceable by a motor (not shown) in the direction of the Y coordinate axis on guide rails 34, 35, on whose face, as in the embodiment of FIG. 1, slide 11 is horizontally displaceably disposed by means of motor drive 12 and on slide 11, vertical slide 13, including machining unit 14, 15, are vertically displaceably disposed. In this embodiment, pedestal 19 is also disposed on the bottom of machine frame 1, which pedestal is integrally formed with or solidly connected to rear side wall 32 in FIG. 2a and rear wall 16 of the machine frame. A swiveling/rotary workpiece table is mounted to an inclined surface of pedestal 19, as described above by referring to FIGS. 1a and 1b. The pedestal includes the components 24 to 28 indicated therein. The skew angle of this inclined surface of pedestal 19 may be in the range of 35 and 60°. The determination of this skew angle is based on the position and alignment of pedestal 19 in the area between the side walls, that is, a centrally or laterally offset position or alignment of the pedestal 19, or both, for example, for machining in over-tilted positions.

Figure 2B:
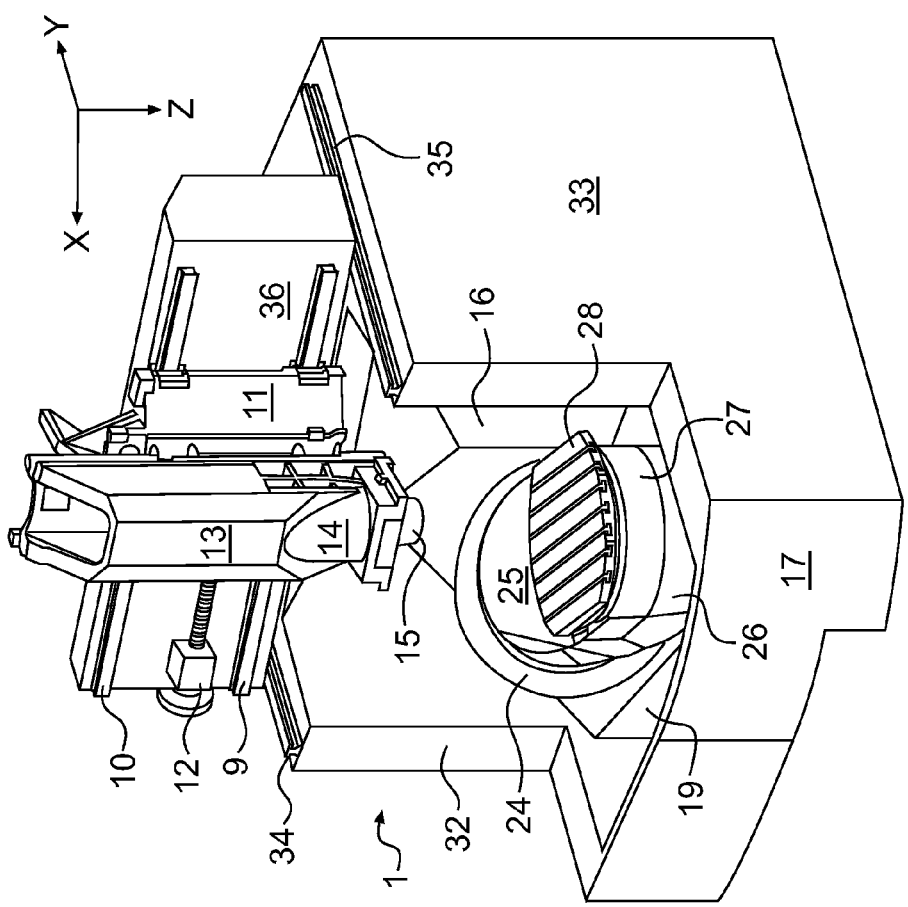
FIG. 2b is a plan view of the FIG. 2a embodiment.

As can be taken particularly from the plan view of FIG. 2b, in this embodiment cross slide 36 also has a trapezoidal shape. The longer support side of the cross slide rests on the left guide rail via correspondingly spaced-apart shoes and its shorter support side rests on the right guide rail. As both guide rails are aligned parallel to the Y coordinate axis, the movement of trapezoidal cross slide 36 also proceeds in the direction of the Y axis. Also in this embodiment, right side wall 33 is shorter at the front as compared to left side wall 32 so that an enlarged access area to the workpiece table and the work area, respectively, of the machine results from the right at an angle in front which makes it easier to load and unload the table by mechanical loading devices. Another cause for this enlarged access area is the trapezoidal shape of the cross slide whose face edge runs at an acute angle β of 15 to 45° to the vertical center plane V of machine frame 1 and thus to the Y coordinate axis. Accordingly, vertically spaced guide rails 9, 10 are also aligned at the angle β to the center plane V at the front of cross slide 36. Rear face edge 38 of cross slide 36 runs diagonally to the center plane V and thus also to the Y coordinate axis, as shown in FIG. 2b. The two lateral edges 39, 40 of the cross slide run parallel to guide rails 34, 35 in the direction of the Y coordinate axis. In order to achieve effective guidance, the longer side 39 of the cross slide is supported on guide rail 34 via two or more guiding shoes. The support of the narrower right side 40 of cross slide 36 can only be provided via one or optionally two guide rails on right guide rail 35.

Regarding their technical concept, the embodiments of the inventive machine tool illustrated in FIGS. 3 to 6 correspond to the embodiment of FIG. 1, in particular with respect to the inclined alignment of guide rails 4, 5 mounted on top of the side walls and thus also to cross slide 6. However, the technical concept shown in FIGS. 2a, 2b may also be applied to the FIGS. 3-6 embodiments. In the embodiments of FIGS. 3 to 6, the positioning of the workpiece mounting unit respectively realized as a swiveling/rotary table in the respective machine frame differs from the embodiment of FIG. 1.

Figure 3:
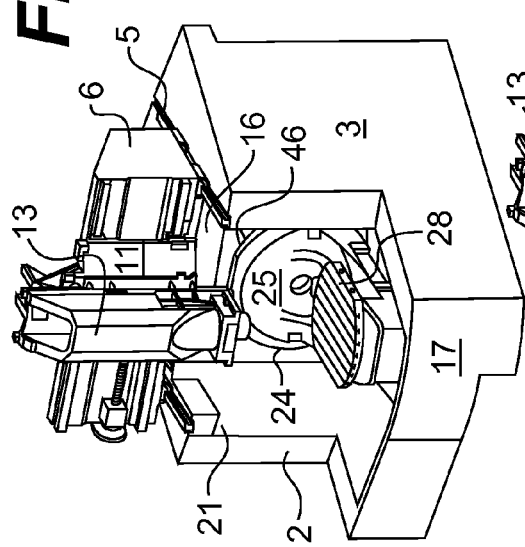
FIGS. 3-6 show further embodiments of the machine tool according to the invention in schematic perspective representations, all comprising a swiveling/rotary workpiece table in various arrangements.

In the embodiment of FIG. 3 side walls 2, 3 of the machine frame are aligned parallel to the vertical plane of the frame and thus also to the Y coordinate axis while guide rails 4, 5 mounted to their top sides run at the angle α shown in FIG. 1c. Accordingly, cross slide 6, which is trapezoidal in plan view, and machining unit 13, including spindle 15 connected to the cross slide, also move on guide rails 4, 5. In the embodiment of FIG. 3 the workpiece mounting construction is not supported on the top inclined surface of a bottom-side pedestal, as in the embodiment of FIG. 1, but the circular disk-shaped foot 24 of console 25 is rotatably supported in recess 45 provided on the inner surface of side wall 2 by using a suitable bearing arrangement (not shown). Inside side wall 2, suitable bearing members for accommodating axial, radial, and tilting loads as well as suitable drive units, such as geared motors or electric direct drives, may be installed. Embodiments of the same type of workpiece swiveling/rotary tables are described, for example, in European patent, EP 835 708 B1, as well as in German patent publication DE 102 59 215 A1. However, these known table constructions have previously not been used in machine tools of the gantry constructional style for operational and spatial reasons.

Figure 4:
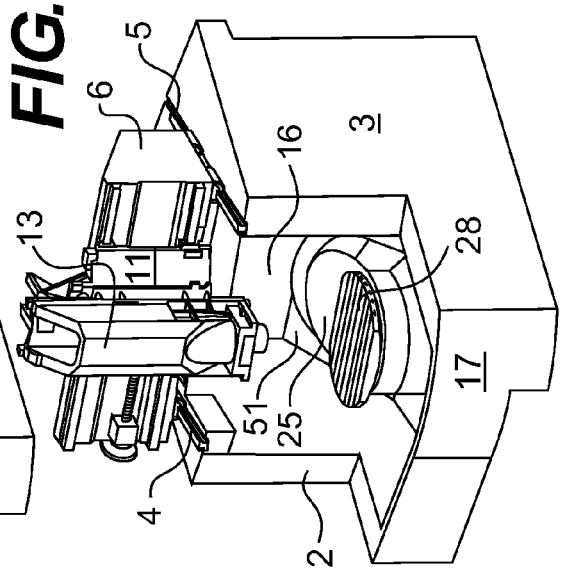

The embodiment of FIG. 4 differs from the embodiment of FIG. 3 merely in that the workpiece mounting unit 24 to 28 is disposed and supported in vertical rear wall 16 of the machine frame so as to be rotatable by a motor (not shown). The arrangement of rotatable console foot 24 in rear wall 16 of the machine frame is particularly favorable with regard to chipping because chip accumulations in critical areas are avoided. In addition thereto, particularly powerful drive systems and stable bearings for console 25 and console foot 24 thereof, respectively, of the workpiece mounting unit may be used because these systems may protrude to the rear from the machine frame.

Figure 5:
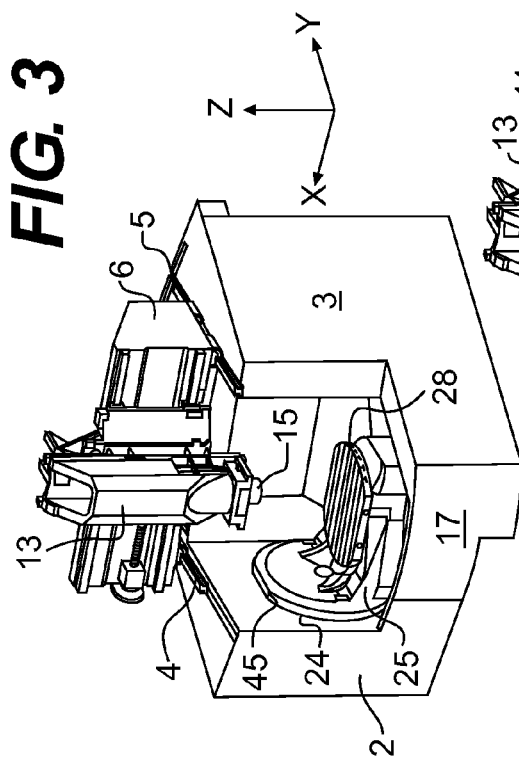

The embodiment of FIG. 5 corresponds as far as possible to the embodiment of FIG. 3, in particular regarding the arrangement of side walls 2, 3, including guide rails 4, 5, and slide arrangement 6, 11, 13, including work spindle 15. In this embodiment workpiece mounting unit 24-28 is also positioned on or in side wall 2 of the machine frame. However, in this embodiment cavity 48 is formed on the wall surface of side wall 2 pointing into the interior space, which cavity has a bottom 49 inclined at an acute angle to the vertical as support surface for a console foot 50. In this embodiment the particularly large access area to workpiece table 28 and the work area, respectively, below work spindle 15, is an advantage. Workpiece mounting unit 24 to 28 and cavity 48, including bottom 49 thereof, may also be disposed in a corner area of the machine frame, that is, in the transition area of side wall 2 into rear wall 16, whereby over-tilted machining operations may be achieved.

Figure 6:
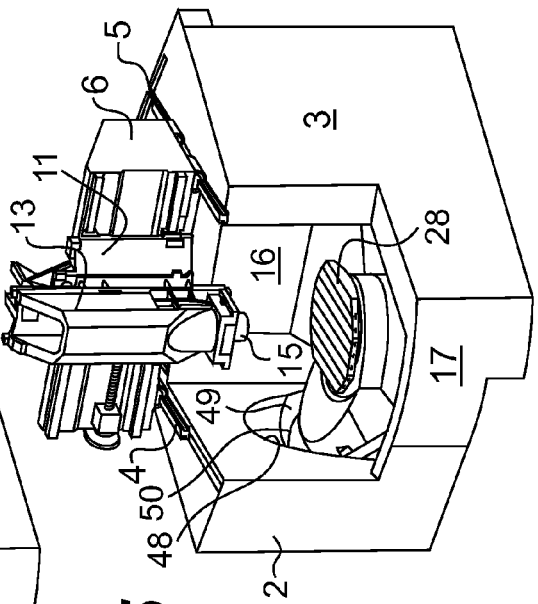

In the embodiment shown in FIG. 6 a workpiece mounting unit according to FIG. 5 is used which, however, is disposed on inclined surface 51 at the lower part of rear wall 16 of the machine frame.

The embodiment of FIG. 7 is also a machine tool of a gantry design comprising a machine frame and associated slide construction corresponding to the embodiment of FIG. 1. In the embodiment of FIG. 7, however, the workpiece mounting unit includes stationary workpiece table 54 disposed on console 55 fixed to frame rear wall 16. At the lower end of vertical slide 56, swiveling/rotary head 57 is disposed as a machining unit, which can be rotated about vertical axis 58. Two-arm fork 59 can be displaced by a motor (not shown) about vertical axis 58. Rotary head 60, which accommodates work spindle 62, is supported between the arms of fork 59 so that it can be swiveled about horizontal axis 61. By using this machine tool a five-axis machining of workpieces is also possible due to the rotary and swiveling options of machining head 60. The advantages of the gantry constructional style and also the enlarged access to workpiece table 54 are the particular features of this machine as well.

In the embodiments of FIGS. 1 to 7 the workpiece mounting unit is respectively realized as a swiveling/rotary table what enables the possibility of a five-axis machining of workpieces. Depending on the drive performance and stability of the respective bearing arrangement, it is also possible to perform turning operations with considerable chipping performances on workpieces in the same clamping.

FIG. 8 illustrates another workpiece mounting unit comprising console 25 rotatable on a 45° support plane and including circular ring-shaped support foot 24. Instead of the table plate 28 used in the above-described embodiments for fixing workpieces, the embodiment of FIG. 8 provides chuck 65 in which cylindrical or bar-shaped workpieces may be clamped for turning and/or milling machining.

The invention is not limited to the above-described embodiments. In particular, individual features of the various embodiments may be combined with one another. In addition thereto, the technical concept of the inventive machine tool, as shown in FIGS. 2a, b and described above, may also be applied to the machine embodiments illustrated in FIGS. 1 and 3-7.

What is claimed is:

1. A machine tool comprising:
    a machine frame having X, Y, and Z coordinate axes and formed with dimensionally rigid side walls, one said side wall being shorter at the front than the other said side wall, thereby forming an enlarged access to the work area of said machine frame, each side wall having a top surface;
    a linear guide on the top surface of each said side wall, said linear guide on said one shorter side wall is shorter than said linear guide on the other said side wall;
    a compound slide having a forward face and being movable on said linear guides, said compound slide has a trapezoidal form when viewed from the top, the shorter side thereof being moveable on said shorter linear guide and the longer side thereof being moveable on said longer linear guide;
    a machining unit having a spindle head, said machining unit being guided on said compound slide so as to be vertically displaceable;
    workpiece mounting unit disposed in the space between said side walls;
    said linear guides being aligned at a predetermined angle to a vertical center plane of said machining frame.

2. The machine tool according to claim 1, wherein:
    said linear guides run parallel to the vertical center plane of said machine frame and thus to the Y coordinate axis; and
    said forward face of said compound slide runs diagonally at an acute angle to the transverse vertical plane of said machine frame and thus to the X coordinate axis.

3. The machine tool according to claim 1, wherein said linear guides are aligned at an angle α to the vertical center plane of said machine frame.

4. The machine tool according to claim 1, wherein said machine frame has a bed-like base comprising a continuous bed and a dimensionally stable rear wall solidly connected to said side walls and said base.

5. The machine tool according to claim 4, wherein said bed-like base defines a floor tray as a chip collecting device.

6. The machine tool according to claim 1, where said forward face of said trapezoidal compound slide runs at right angles to said linear guide and thus at an acute angle α diagonally to the vertical center plane (V) of said machine frame.

7. The machine tool according to claim 1, wherein said workpiece mounting unit comprises a swiveling/rotary table and has a swiveling console forming an angled support for a workpiece rotary table.

8. The machine tool according to claim 7, wherein said console is swivelable about a first rotational axis and said workpiece rotary table is rotatable about a second rotational axis.

9. The machine tool according to claim 7, wherein said console is supported and held so that it can be swiveled about the first rotational axis by means of a console foot, said console foot being mounted in or on a side wall or on the rear wall of said machine frame.

10. The machine tool according to claim 9, wherein in one said side wall or in said rear wall of said machine frame a recess open toward the work area is disposed in which said console foot of said console is supported on a bearing arrangement so as to be rotatable, said console foot having a circular disk shape.

11. The machine tool according to claim 10, wherein said bearing arrangement has a bearing journal or an axial/radial bearing engaging a hollow cylinder.

12. The machine tool according claim 10, and further comprising a cavity having an inclined bottom formed in one said side wall or in said rear wall as an oblique support surface for supporting said console foot.

13. The machine tool according to claim 7, wherein said machine frame has a bed-like bottom on which a pedestal is provided as support for said console of said workpiece mounting unit.

14. The machine tool according to claim 9, wherein said machine frame has a bed-like bottom on which a pedestal is provided as support for said console of said workpiece mounting unit.

15. The machine tool according to claim 14, wherein said pedestal has a support surface on which is formed an inclined surface to support said rotatable console foot of said console.

16. The machine tool according to claim 13, wherein said pedestal is solidly connected to said bottom and to at least one said side wall.

17. The machine tool according claim 15, wherein said pedestal is disposed in a corner area of said machine frame with said support surface pointing into forward interior space of the machine frame.

18. The machine tool according to claim 7, wherein said workpiece rotary table is configured as a chuck.

19. The machine tool according to claim 1, wherein said machining unit comprises a swiveling/rotary head comprising an integrated motor spindle and said workpiece mounting unit is configured as a stationary workpiece table.

20. The machine tool according to claim 19, wherein said swiveling/rotary head has a fork that can be rotated about a vertical axis, the two arms of said fork having a rotary head therebetween which is supported so as to be swivelable, said rotary head carrying the work spindle.

21. A machine tool comprising:
a machine frame having X, Y, and Z coordinate axes and formed with dimensionally rigid side walls, each side wall having a top surface;
a linear guide on the top surface of each said side wall;
a compound slide having a forward face and being displaceable on said linear guides;
a machining unit having a spindle head, said machining unit being guided on said compound slide so as to be vertically displaceable;
workpiece mounting unit disposed in the space between said side walls;
said linear guides being aligned at an acute angle α to the vertical center plane (V) of said machine frame;
one said side wall being shorter at the front than the other said side wall thereby forming an enlarged access to the work area of said machine tool, said workpiece mounting unit being configured as a swiveling/rotary table and having a swiveling console forming an angled support for a workpiece rotary table, said console being swivelable about a first rotational axis and containing an installed drive motor mounted to rotate said workpiece rotary table about a second rotational axis.

22. A machine tool comprising:
a machine frame having X, Y, and Z coordinate axes and formed with dimensionally rigid side walls, each side wall having a top surface;
a linear guide on the top surface of each said side wall, said linear guides run parallel to the vertical center plane of said machine frame and thus to the Y coordinate axis;
a compound slide having a forward face and being movable on said linear guides, said forward face of said compound slide runs diagonally at an acute angle to the transverse vertical plane of said machine frame and thus to the X coordinate axis, said forward face of said compound slide is arranged at an acute angle β to said linear guides and moves diagonally to the vertical center plane (V) of said machine frame;
a machining unit having a spindle head, said machining unit being guided on said compound slide so as to be vertically displaceable;
workpiece mounting unit disposed in the space between said side walls;
said linear guides being aligned at a predetermined angle to a vertical center plane of said machining frame; and
one said side wall being shorter at the front than the other said side wall, thereby forming an enlarged access to the work area of said machine frame.

* * * * *

UNITED STATES PATENT AND TRADEMARK OFFICE
CERTIFICATE OF CORRECTION

PATENT NO. : 8,845,246 B2  Page 1 of 1
APPLICATION NO. : 13/009479
DATED : September 30, 2014
INVENTOR(S) : Tüllmann et al.

It is certified that error appears in the above-identified patent and that said Letters Patent is hereby corrected as shown below:

Title Page Item (74) Attorney, Agent, or Firm

Change "The Makham Firm" to --The Maxham Firm--

Signed and Sealed this
Sixteenth Day of December, 2014

Michelle K. Lee
*Deputy Director of the United States Patent and Trademark Office*